(12) United States Patent
Takeshita et al.

(10) Patent No.: US 6,485,861 B2
(45) Date of Patent: Nov. 26, 2002

(54) BATTERY PACK, BATTERY CHARGER AND AN ELECTRONIC DEVICE USING A BATTERY PACK

(75) Inventors: Toshio Takeshita, Kanagawa (JP); Tomoyuki Kubotera, Tokyo (JP); Toshio Koyama, Kanagawa (JP); Hisashi Aoki, Aichi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,565
(22) Filed: Apr. 2, 1999

(65) Prior Publication Data
US 2002/0012831 A1 Jan. 31, 2002

(30) Foreign Application Priority Data
Apr. 6, 1998 (JP) ............................................ 10-093074

(51) Int. Cl.[7] .............................. H01M 2/10; H02J 7/00
(52) U.S. Cl. ......................... 429/99; 429/100; 320/110; 320/112; 320/113
(58) Field of Search ........................... 429/97, 99, 100; 320/112, 113, 110

(56) References Cited

U.S. PATENT DOCUMENTS

| | | | |
|---|---|---|---|
| 4,227,140 A | * | 10/1980 | Nardella et al. ................ 320/2 |
| 4,319,178 A | | 3/1982 | Sugalski |
| 4,806,440 A | | 2/1989 | Hahs, Jr. et al. |
| 5,240,787 A | | 8/1993 | Goldschmidt et al. |
| 5,248,927 A | | 9/1993 | Takei et al. |
| 5,510,205 A | * | 4/1996 | Ozer ............................ 429/91 |
| 5,567,542 A | | 10/1996 | Bae |
| 5,626,979 A | * | 5/1997 | Mitsui et al. .................. 429/97 |
| 6,060,193 A | * | 5/2000 | Remes et al. .................. 429/96 |
| 6,326,766 B1 | * | 12/2001 | Small .......................... 320/112 |

FOREIGN PATENT DOCUMENTS

EP  0 405 803  10/1995

OTHER PUBLICATIONS

Patent Abstracts of Japan 10027587 A (Matsushita Electric Ind Co Ltd), Jan. 27, 1998.
Patent Abstracts of Japan 07320708 A (Toshiba Battery Co Ltd), Dec. 8, 1995.

* cited by examiner

*Primary Examiner*—Carol Chaney
*Assistant Examiner*—Tracy Dove
(74) *Attorney, Agent, or Firm*—Frommer Lawrence & Haug LLP; William S. Frommer; Matthew K. Ryan

(57) ABSTRACT

A battery pack securing mechanism for securing battery packs of varaying numbers of battery cells, a battery charger capable of charging the battery packs or an electronic equipment capable of using the battery packs. In a battery pack having the optional number of cells built therein, this terminal is provided in the same position as a terminal position wherein only one cell is accommodated within the battery pack. A charger and an electronic equipment using a pack have a pack securing section capable of securing battery a pack having at least two cells accommodating therein in parallel, and includes an engaging member for engaging at least one cell pack with the battery pack securing section and a connecting member connected to the positive and negative electrode terminals of the one cell pack and disposed at such a position that charging or discharging can be performed. Accordingly battery, packs accommodating different number of cells and of various arrangements and configurations can be used.

3 Claims, 2 Drawing Sheets

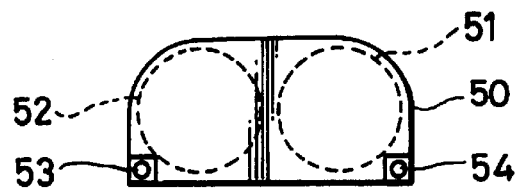
FIG. 1
(PRIOR ART)
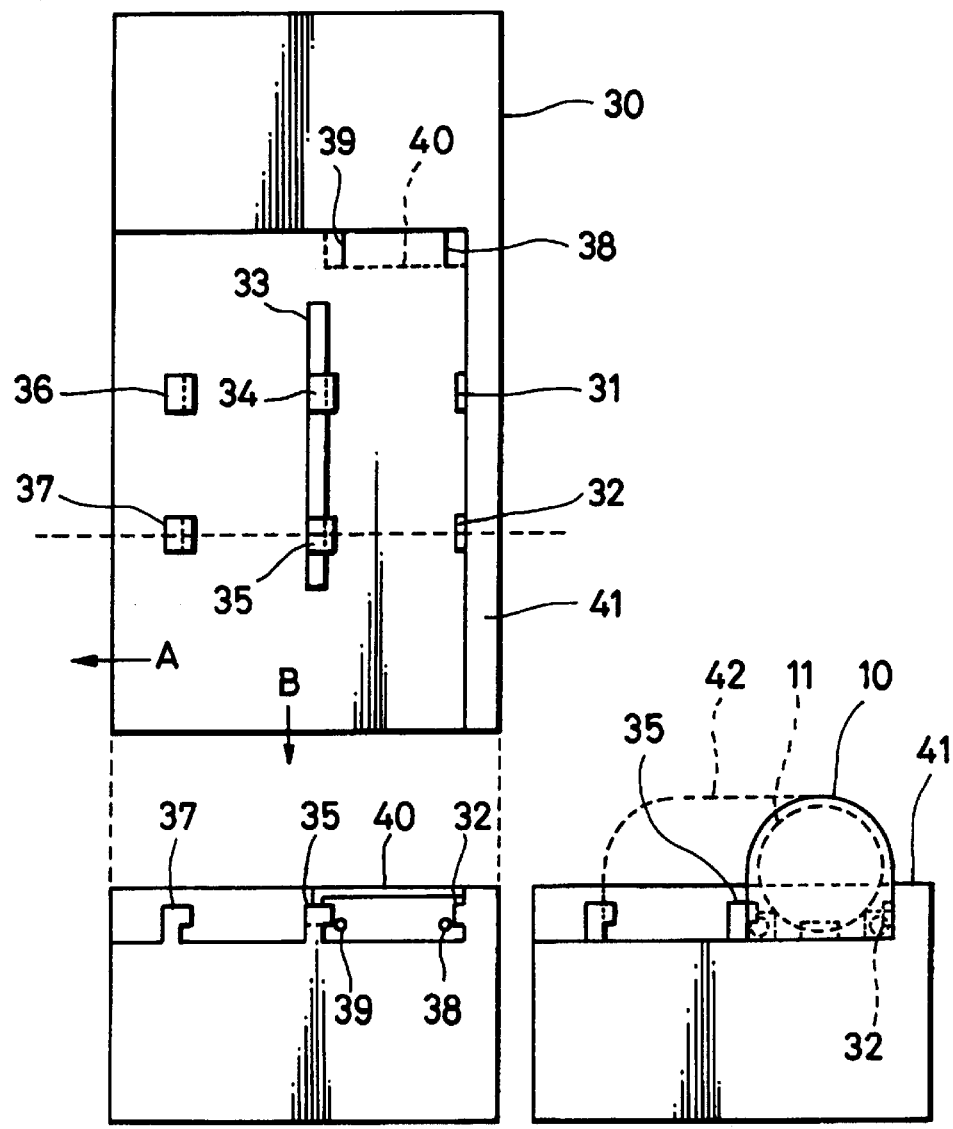
FIG. 4 (a)     FIG. 4 (b)

FIG. 2
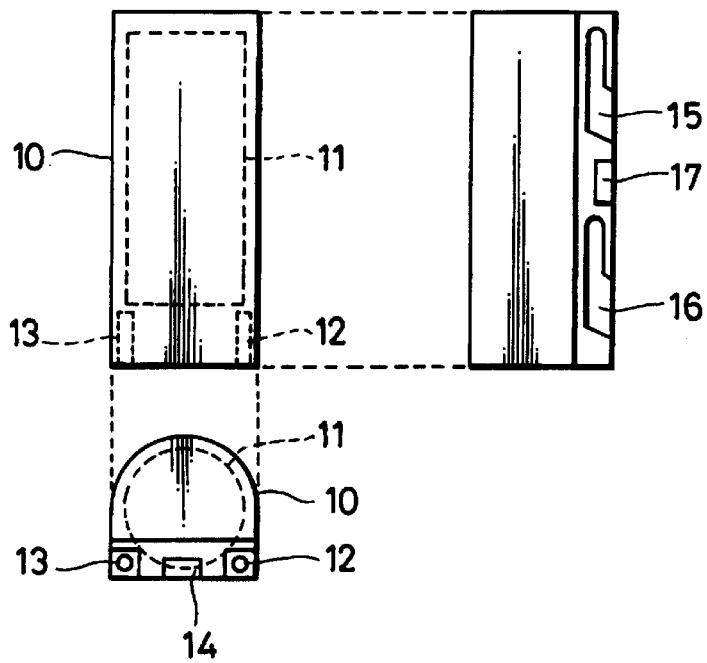
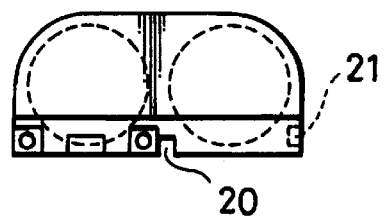
FIG. 3 (a)
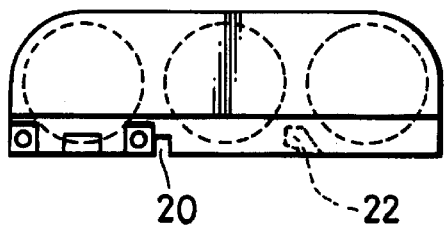
FIG. 3 (b)
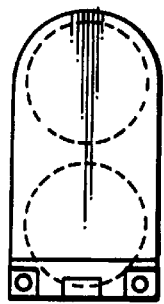
FIG. 3 (c)
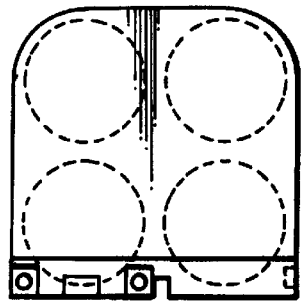
FIG. 3 (d)
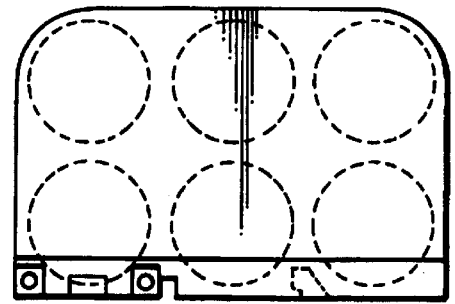
FIG. 3 (e)

BATTERY PACK, BATTERY CHARGER AND AN ELECTRONIC DEVICE USING A BATTERY PACK

BACKGROUND OF THE INVENTION

1. Field of the Invention

The present invention relates to a battery pack, a battery charger, and n electronic device using the battery pack, and more particularly to plural kinds of battery packs having an optional number of battery cells accommodated therein, a battery charger capable of charging the battery packs, and electronic equipment capable of using the battery packs.

2. Description of the Related Art

FIG. 1 is a side view showing the structure of a battery pack according to the prior art. For example, a conventional battery pack 50 has two battery cells 51 and 52 built therein, and positive electrode and negative electrode terminals 53 and 54 are positioned on both ends of a side face thereof. In charging the battery pack which is used in conjunction with electronic device, for example, a video camera with a built-in recorder, a video light and the like, only the battery pack is engaged with a battery charger. In a high capacity-type battery pack, cells have been overlapped in the thickness direction, for example, to obtain increased capacity so that the high capacity-type battery pack is engaged with both the battery charger and the electronic device.

In the conventional battery pack as, shown in FIG. 1, in order to charge the battery pack in the battery charger, the battery pack must have at least a bottom face which is of the same shape as the battery charger. Therefore, there has been a problem that the shape and capacity of the pack have neither flexibility nor expandability.

SUMMARY OF THE INVENTION

It is an object of the present invention to solve the above-mentioned problems of the prior art and to provide plural kinds of battery packs having an optional number of battery cells built therein, a battery charger capable of charging the battery packs and electronic device capable of using the battery packs.

According to an aspect of the present invention, a battery pack is provided which can accommodate a varying number of battery cells therein, which a spacing between the centers of the positive electrode and the negative electrode terminals which is smaller than a the width of the battery cell. Furthermore, a battery charger for charging a battery pack or, and electronic device using a battery pack are characterized by comprising a battery pack securing surface capable of securing a battery pack having at least one cell accommodated therein, an engaging member for engaging the battery pack with the battery pack securing surface, and a connecting member connected to the positive electrode and negative electrode terminals of the battery pack and disposed at such a position that charging or discharging of the battery pack can be performed.

According to the present invention, arrangement of the positive and negative electrode terminals is the same irrespective of the bottom shape of the battery pack and conforms to the arrangement of the positive and negative electrode terminals when only one cell is accommodated with the battery pack. However, in one embodiment of an alternate bottom shape of the battery pack, the shape of the battery pack can conform to the shape of the electronic device and be engaged therewith. In the electronic device, therefore, battery packs having various shapes and capacities can be used.

BRIEF DESCRIPTION OF THE DRAWINGS

FIG. 1 is a side view showing the structure of a battery pack according to the prior art;

FIG. 2 is a block diagram showing the structure of a battery pack to which the present invention is applied;

FIGS. 3(A)–(E) are block diagrams showing different configurations of battery packs to which the present invention can be utilized; and FIG. 4(A) is a front view showing the structure of the face of an electronic device to which the battery pack is to be fixed according to the present invention. FIG. 4(B) is a sectional view showing a battery pack having one cell in accordance with the teachings of the present invention being secured to an electronic device.

DESCRIPTION OF THE PREFERRED EMBODIMENTS

An embodiment of the present invention will be described below in detail. FIG. 2 is a block diagram showing the structure of a battery pack to which the present invention is applied. With the structure shown in FIG. 2, the battery pack has one built-in battery cell acting as a minimum unit. Some recent electronic devices can be operated at a voltage of one battery cell, for example, at a voltage of 1.2 to 3.6 V, for example. Accordingly, the battery pack including one cell has a minimum structure correspondingly.

A battery cell 11 is built in a battery pack 10. Positive and negative electrode terminals 12 and 13 for deriving the power of the cell and a communication terminal 14 for detecting the residual charging amount of the cell are provided on one of the side faces of the cell pack in a longitudinal direction thereof. The positive electrode and negative electrode terminals 12 and 13 are hollow and cylindrical electrodes. As shown in FIG. 2, the distance between central axes of the cylinders of both the electrodes is set smaller than the width (diameter) of the battery cell 11. The communication terminal 14 is a plate-shaped electrode, and an optional number of terminals having other functions may further be provided.

Concave portions 15 and 16 acting as an engaging member for engaging the battery pack with the charger or the electronic device are provided in the vicinity of the bottom of both the side faces of the pack in the width direction (faces which are in contact with the charger or the electronic device). Four concave portions 15 and 16 are engaged with clicks acting as the engaging means of the charger or the electronic device which will be described later in detail below, thereby securing the battery pack to the charger or the electronic device. A dent 17 is provided at such a position in the engaging member so as to correspond to a projection of the charger or the electronic device. Consequently, only the battery pack having the dent at the corresponding position can be secured to the charger or the electronic equipment.

FIG. 3 is a block diagram showing the structure of another battery pack to which the present invention is applied. FIG. 3(*a*) is a side view showing the structure of a battery pack having two battery cells built therein. A channel 20 for positioning, when the battery pack on a charger or electronic device, is provided on the bottom of the pack. The channel 20 is engaged with a band-shaped projection provided on the charger or the electronic equipment which will be described below so that the battery pack can be loaded on the charger or the electronic device at a predetermined position. A concave portion which is or is not engaged with a click of the charger or the electronic device is provided in the middle of the channel 20. A concave portion similar to the concave portion 21 of FIG. 1 is provided in the vicinity of the bottom of both side faces of the pack in the width direction.

FIG. 3(b) is a side view showing the structure of a battery pack having three battery cells accommodated therein. In the same manner as in the battery pack of FIG. 3(A), a channel 20 for positioning, the battery pack on the charger or the electronic device is provided on the bottom of the pack. A concave portion 22 to be engaged with click of the charger or the electronic device is provided on the bottom side of the battery pack between a central cell and a right cell. As shown in FIG. 3(B) no concave portion is provided on the right side face of the battery pack in the width direction.

FIGS. 3(c), (d) and (e) show examples in which two battery cells shown in FIGS. 2, 3(a) and 3(b) are stacked in the height direction to obtain increased capacity of the battery pack. Respective bottom shapes thereof are substantially the same as in the pack in which the battery pack accommodates single cell.

FIG. 4(A) is a front view showing the structure of the face of a battery charger or electronic device to which the battery pack is secured according to the present invention FIG. 3(B) is a sectional view taken along the dotted line 4B—4B of FIG. 4A. Or projections 31, 32 and 34 to 37 acting as securing member for engaging with and holding the battery pack are provided on the face of a battery charger or an electronic device 30 to which the battery pack is to be secured.

Pins 38 and 39 are terminals which contact the positive and negative electrode terminals 12 and 13 of the battery pack to perform charging or discharging, and are provided at positions corresponding to the terminal positions of the battery accommodating pack one cell. In the case of the charger, a pin cover 40 is provided for covering the pins 38 and 39 in use and for receding into the device 30 when the pack is secured thereto in order to prevent short circuiting. In addition, another pin for contacting the communication terminal 14 of the pack is also provided.

FIG. 4(b) is a side view showing the battery pack having one cell accommodated being secured therein to a battery charger or to electronic device. When the pack 10 is to so secured, the concave portions 15 and 16 provided on both side faces of the pack 10 in the width direction thereof (side and bottom faces may be all right in case of two or more cells) and the clicks 31, 32, 34 and 35 provided on the face of the electronic device to which the battery pack is to be fixed are first aligned in position. The bottom of the pack 10 then contacts the face of the electronic device to which the battery pack is to be fixed, and the pack 10 is then moved upwardly to engage and fix the clicks and the concave portions to each other. In addition the terminals 12 and 13 of the pack are connected to the pins 38 and 39 of charger or electronic device. A dotted line 42 in FIG. 4(b) indicates a position at which the pack having two cells accommodated therein is secured. Although not shown, in the case of a battery pack having three cells accommodated therein, the position at which the battery pack is secured to the charger or the electronic device extends to the left side and protrudes from the equipment.

The clicks 31 and 32 are provided on a right side projection 41 on the securing face, of the device 30 and are engaged with the concave portions 15 and 16 of the battery packs. The clicks 34 and 35 provided on a central band-shaped projection 33 of the device 30 act as securement members for a battery pack having at least one cell accommodated therein. Since the battery pack having two or more cells provided in the width direction is engaged with the left clicks 36 and 37, the concave portions of that battery pack may or may not be engaged with the clicks 34 and 35 provided on the central band-shaped projection 33.

In FIG. 4(A), a left side (shown by arrow A, and a lower side (shown by arrow B) on the fixing face for the battery pack have no projections but are opened. Accordingly, it is possible to secured a battery pack having an optional shape in which the optional number of battery cells are arranged in parallel or series. All the battery packs can be engaged and held with the right clicks 31 and 32 and the central clicks 34 and 35. In this case, the left clicks 36 and 37 are not required. However, a relatively large battery pack can be stably held by using the left clicks 36 and 37.

Other alternative embodiments of the present invention are set forth below. For instance, although FIG. 4(A) illustrates that two directions of the battery pack securing surface of the equipment are opened, it is also possible that three directions are opened other than the directions the projections having the pins provided thereon are opened, for example. In this case, as shown in FIG. 3(B) the pack having three cells accommodated therein can also have a terminal provided on both sides of a central cell. It is also possible that only one of left and right sides or only a lower side is of the battery pack securing surface maybe opened.

Furthermore, a cover of the battery pack may also be provided, so that the pack securing surface of the equipment is covered. Also in this case, the present invention can also be applied to a battery pack securing surface capable of securing a battery pack having at least two cells accommodates therein in parallel.

While in one example the clicks are provided in three lines on the equipment side as the means for engaging the battery pack with the equipment, clicks may further be provided in four or more lines for engagement with both side faces of a pack having three or more cells accommodated therein, for example. Furthermore, the engaging member having a click may be provided on the pack side and a concave portion or hole may be provided on the equipment side.

As described above, the present invention provides for the terminal arrangement of each of the battery packs having different bottom shapes to be the same as the terminal shape of the battery pack having a minimum unit structure (i.e. one cell accommodated therein. In addition the battery pack having an optional bottom shape can be engaged with the equipment side, and therefore, battery packs having various shapes and capacities can be used in the electronic device.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A battery pack having at least two battery cells accommodated therein which is capable of being charged by a battery charger, the battery pack comprising:

a bottom region including a first electrode terminal positioned near a side face of the battery pack and a second electrode terminal positioned away from the side face of the battery pack, said first and second electrode terminals are capable of electrically contacting the battery charger during charging;

a space between a center of the first electrode terminal and a center of the second electrode terminal is less than a width of one of the battery cells and wherein a communication terminal for detecting the residual charging amount of the battery pack is provided in said space;

a plurality of concave engaging portions capable of engaging the battery pack with the battery charger; and wherein a channel is provided in the bottom region of the battery pack adjacent to the second electrode terminal for properly positioning the battery pack in the battery charger.

2. A battery charger for charging a battery pack comprising:

a battery pack securing section for securing a battery pack having at least two cells accommodated therein;

engaging means for engaging the battery pack having at least two cells accommodated therein with the battery pack securing section wherein said engaging means includes engaging members arranged in at least two parallel sets for engagement with the battery pack;

connecting means connected to a positive electrode terminal and a negative electrode terminal provided in a bottom region of the battery pack having at least two cell accommodated therein and being disposed at such a position that charging or discharging can be performed;

a space between a center of the positive electrode terminal and a center of the negative electrode terminal is less than a width of one of the battery cells, and wherein said battery charger has a band-shaped projection which is capable of engaging a channel formed on the bottom region of the battery pack for properly positioning the battery pack in the battery charger.

3. An electronic device using a battery pack, comprising:

a battery pack securing section for securing a battery pack having at least two cells accommodated therein;

engaging means for engaging the battery pack having at least two cells accommodated therein with the battery pack securing section, wherein said engaging means includes engaging members arranged in at least two parallel sets for engagement with the battery pack;

connecting means connected to a positive electrode terminal and a negative electrode terminal provided in a bottom portion of the battery pack having the at least two cells accommodated therein and being disposed at such a position that charging or discharging can be performed;

a space between a center of the positive electrode terminal and a center of the negative electrode terminal is less than a width of one of the battery cells, and wherein said battery charger has a band-shaped projection which is capable of engaging a channel formed on the bottom region of the electronic device for properly positioning the battery pack in the electronic device.

\* \* \* \* \*